(12) United States Patent
Liang et al.

(10) Patent No.: US 6,930,818 B1
(45) Date of Patent: Aug. 16, 2005

(54) ELECTROPHORETIC DISPLAY AND NOVEL PROCESS FOR ITS MANUFACTURE

(75) Inventors: Rong-Chang Liang, Newton, MA (US); Mary Chan-Park, Chelmsford, MA (US); Scott C-J Tseng, Billerica, MA (US); George Wu, Reading, MA (US); HongMei Zang, Malden, MA (US)

(73) Assignee: SiPix Imaging, Inc., Milpitas, CA (US)

( * ) Notice: Subject to any disclaimer, the term of this patent is extended or adjusted under 35 U.S.C. 154(b) by 0 days.

(21) Appl. No.: 09/518,488

(22) Filed: Mar. 3, 2000

(51) Int. Cl.$^7$ ............ G02B 26/00; G09G 3/34; G03G 17/04

(52) U.S. Cl. ............ 359/296; 345/107; 430/32

(58) Field of Search ............ 359/296, 290, 359/238, 237; 345/105, 107; 204/450, 600; 430/32, 34, 38

(56) References Cited

U.S. PATENT DOCUMENTS

| | | |
|---|---|---|
| 3,612,758 A | 10/1971 | Evans .................. 348/803 |
| 3,668,106 A | 6/1972 | Ota .................... 204/299 |
| 3,928,671 A | 12/1975 | Robusto et al. |
| 4,071,430 A | 1/1978 | Liebert |
| 4,093,534 A | 6/1978 | Carter et al. |
| 4,285,801 A | 8/1981 | Chiang |
| 4,680,103 A | 7/1987 | Beilin Solomon I. et al. |
| 4,741,988 A * | 5/1988 | Van der Zande et al. ... 430/312 |
| 4,891,245 A | 1/1990 | Micale |
| 5,276,438 A | 1/1994 | DiSanto et al. |
| 5,279,511 A | 1/1994 | DiSanto et al. .............. 445/24 |
| 5,380,362 A | 1/1995 | Schubert |
| 5,403,518 A | 4/1995 | Schubert |
| 5,480,938 A | 1/1996 | Badesha et al. |
| 5,573,711 A | 11/1996 | Hou et al. |
| 5,699,097 A * | 12/1997 | Takayama et al. ......... 347/171 |
| 5,914,806 A | 6/1999 | Gordon, II et al. |
| 5,930,026 A | 7/1999 | Jacobson et al. ........... 359/296 |
| 5,943,113 A | 8/1999 | Ichihashi |
| 5,961,804 A | 10/1999 | Jacobson et al. ........... 204/606 |
| 5,967,871 A | 10/1999 | Kaake et al. |
| 5,978,062 A | 11/1999 | Liang et al. |

(Continued)

FOREIGN PATENT DOCUMENTS

| | | |
|---|---|---|
| EP | 1089 118 A2 | 4/2001 |
| JP | 57104116 | 6/1982 |
| JP | 59-034518 | 2/1984 |
| JP | 5917930 | 9/1984 |
| JP | 62-099727 | 5/1987 |
| JP | 62-203123 | 9/1987 |
| JP | 01-300232 | 12/1989 |
| JP | 02223934 | 9/1990 |
| JP | 02-223936 | 9/1990 |
| JP | 02284125 | 11/1990 |
| JP | 04-113386 | 4/1992 |
| JP | 09-160052 | 6/1997 |
| WO | WO 98/57226 | 12/1998 |
| WO | WO 99/56171 | 11/1999 |
| WO | WO 00/36649 | 6/2000 |
| WO | WO 00/60410 | 10/2000 |

OTHER PUBLICATIONS

Ota, et al., "Electrophoretic Image Display (EPID) Panel," *Wireless Research Laboratory, Matsushita Electric Industrial Company, Ltd., Osaka, 571, Japan*, Feb. 7, 1973.

(Continued)

Primary Examiner—Hung Xuan Dang
Assistant Examiner—Tuyen Tra
(74) Attorney, Agent, or Firm—Howrey Simon Arnold & White, LLP

(57) ABSTRACT

This invention relates to an electrophoretic display comprising cells of well-defined shape, size and aspect ratio which cells are filled with charged pigment particles dispersed in a solvent, and novel processes for its manufacture.

30 Claims, 11 Drawing Sheets

U.S. PATENT DOCUMENTS

| | | | |
|---|---|---|---|
| 6,017,584 A | | 1/2000 | Albert et al. ............ 427/213.3 |
| 6,064,508 A | * | 5/2000 | Forgette et al. ............. 359/267 |
| 6,067,185 A | * | 5/2000 | Albert et al. ............... 359/296 |
| 6,113,810 A | * | 9/2000 | Hou et al. .................. 252/572 |
| 6,120,588 A | | 9/2000 | Jacobson |
| 6,120,839 A | * | 9/2000 | Comiskey et al. ....... 427/213.3 |
| 6,172,798 B1 | | 1/2001 | Albert et al. |
| 6,184,856 B1 | * | 2/2001 | Gordon, II et al. ......... 345/107 |
| 6,239,896 B1 | * | 5/2001 | Ikeda ......................... 359/240 |
| 6,312,304 B1 | | 11/2001 | Duthaler et al. |
| 6,319,381 B1 | | 11/2001 | Nemelka |
| 6,327,072 B1 | | 12/2001 | Comiskey et al. |
| 6,337,761 B1 | | 1/2002 | Rogers et al. |
| 6,392,785 B1 | | 5/2002 | Albert et al. |
| 6,392,786 B1 | | 5/2002 | Albert |
| 6,400,430 B2 | * | 6/2002 | Nakao et al. ................. 349/89 |
| 6,524,153 B1 | | 2/2003 | Ikeda et al. |
| 6,525,865 B2 | | 2/2003 | Katase |
| 6,652,075 B2 | | 11/2003 | Jacobson |
| 2002/0182544 A1 | | 12/2002 | Chan-Park et al. |

OTHER PUBLICATIONS

Andre W. L. Dalisa, "Electrophoretic Display Technology," *Philips Laboratories, Briarcliff Manor, NY 10510*, Revised Mar. 8, 1977.

Murau and Singer, "The understanding and elimination of some suspension instabilities in an electrophoretic display," *Philips Laboratories, Briarcliff Manor, NY 10510*, Apr. 10, 1978.

Nakamura, et al., "Development of Electrophoretic Display Using Microcapsulated Suspension," *NOK Corporation, Kanagawa, Japan & NOK Coporation, Ibaraki, Japan*, 1998, (pp. 1014–1017).

J. C. Lewis, "Electrophoretic Displays," *Allen Clark Research Centre, The Plessey Company Limited, Caswell, Towcester, Northants, England,*(pp. 223–240).

Comiskey, et al., "An electrophoretic ink for all–printed reflective electronic displays," *Letters to Nature*, MIT, The Media Laboratory, 20 Ames street, Cambridge, Ma 02139–4307, USA, May, 1998.

Dalisa, A.L., "Electrophoretic Display Technology", *IEEE Trans. Electron Devices—42*:827–834 (1977).

Harbour, J.R., et al., "Subdivided Electrophoretic Display," *Xerox Disclosure Journal, US, Xerox Corporation, Stamford, Conn.—4*(6):705 Nov. 1979 (XP002123212) the whole document, p. 75.

Harvey, T.G., "Replication techniques for micro–optics", *SPIE Proc.–3099*:76–82 (1997).

Mürau P., et al., "The understanding and elimination of some suspension instabilities in an electrophoretic display", *J. Appl. Phys.—49*(9):4820–4829 (1978).

Slafer, W.D., et al., "Continuous Manufacturing of Thin Cover Sheet Optical Media", *SPIE Proc.—1663*:324–334 (1992).

Hopper, M.A., et al., "An Electrophoretic Display, its Properties, Model, and Addressing", *IEEE Transactions on Electron Devices–26*(8):1148–1152 (1979).

* cited by examiner

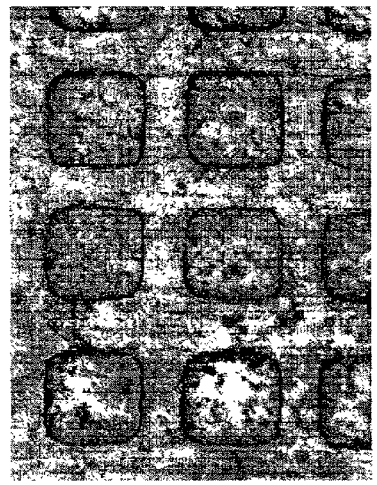
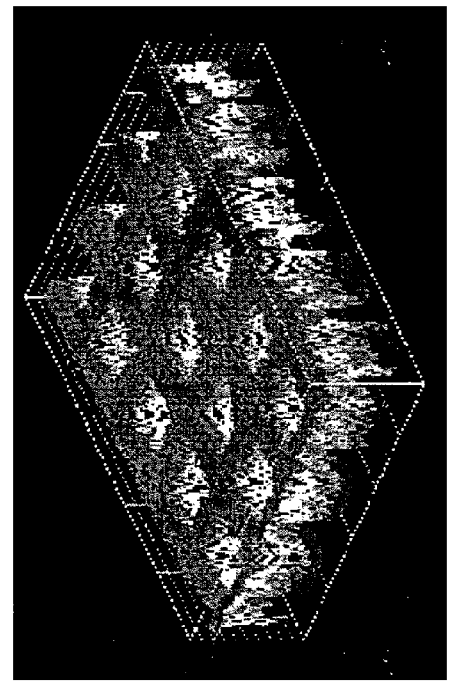
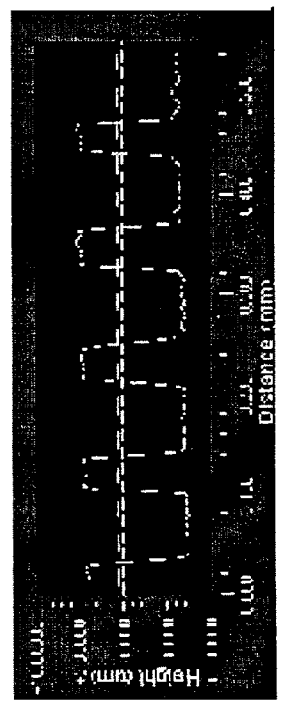
Figure 4

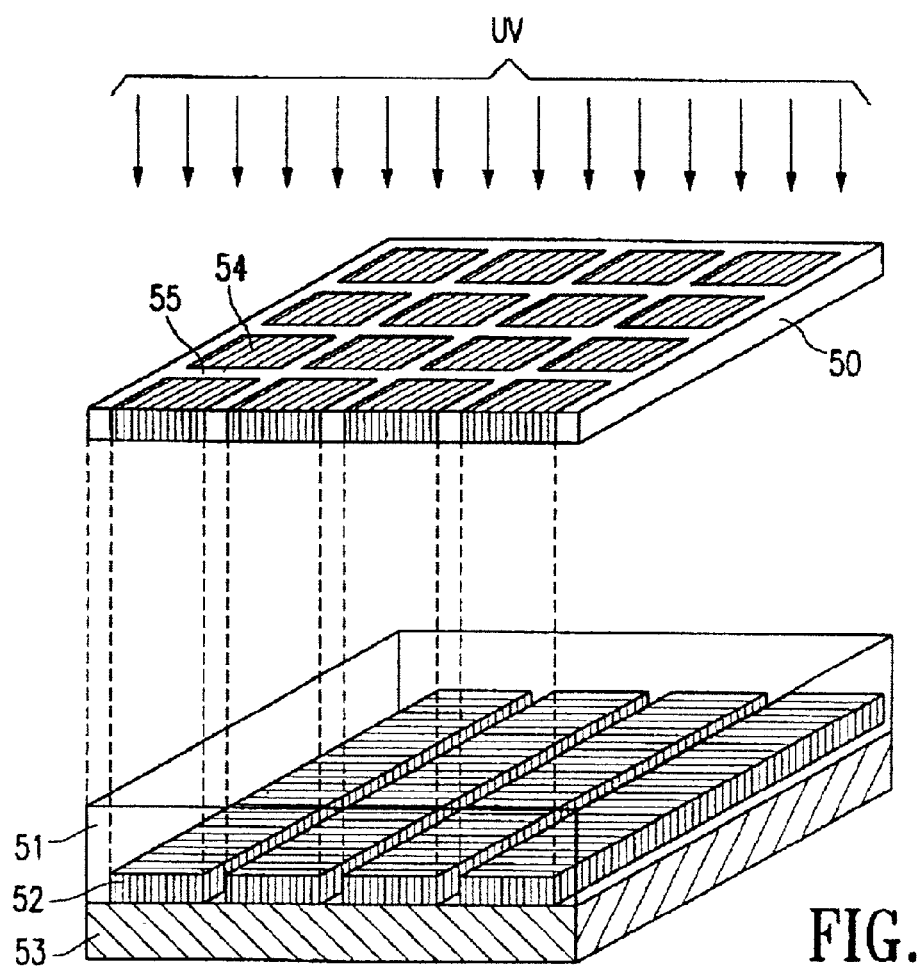
FIG. 5a1
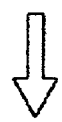
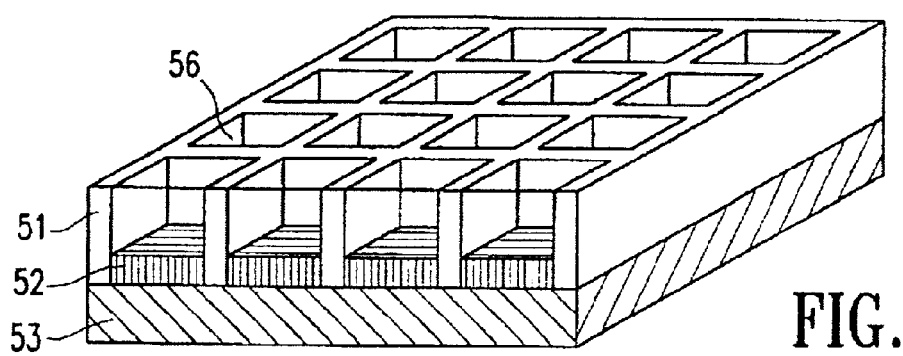
FIG. 5a2

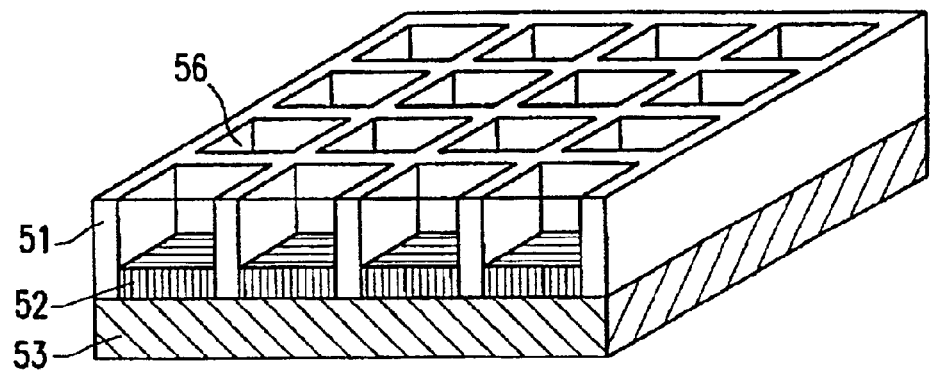
FIG. 5b2
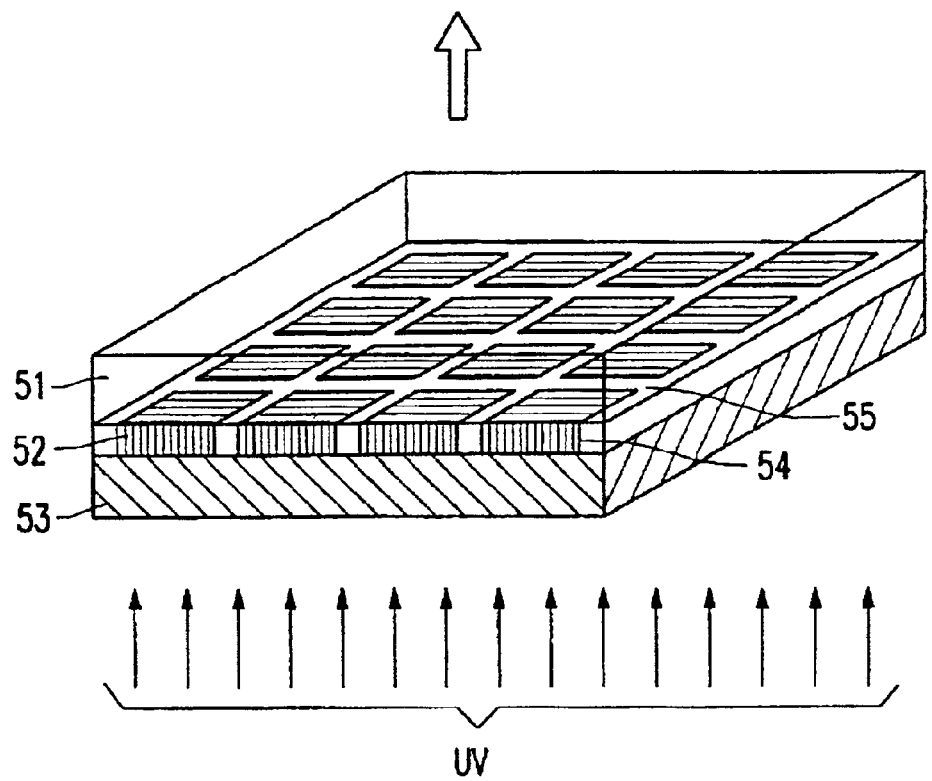
FIG. 5b1

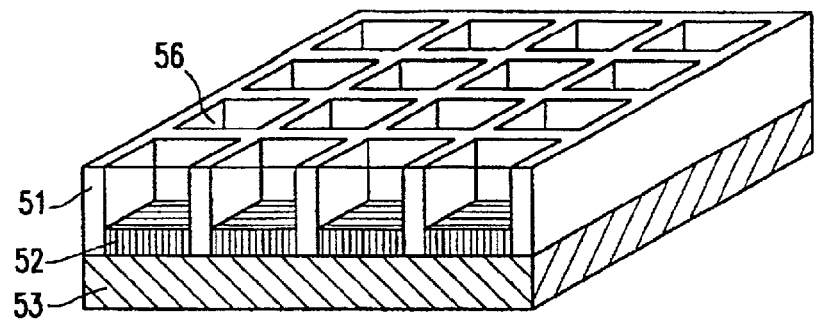
FIG. 5c2
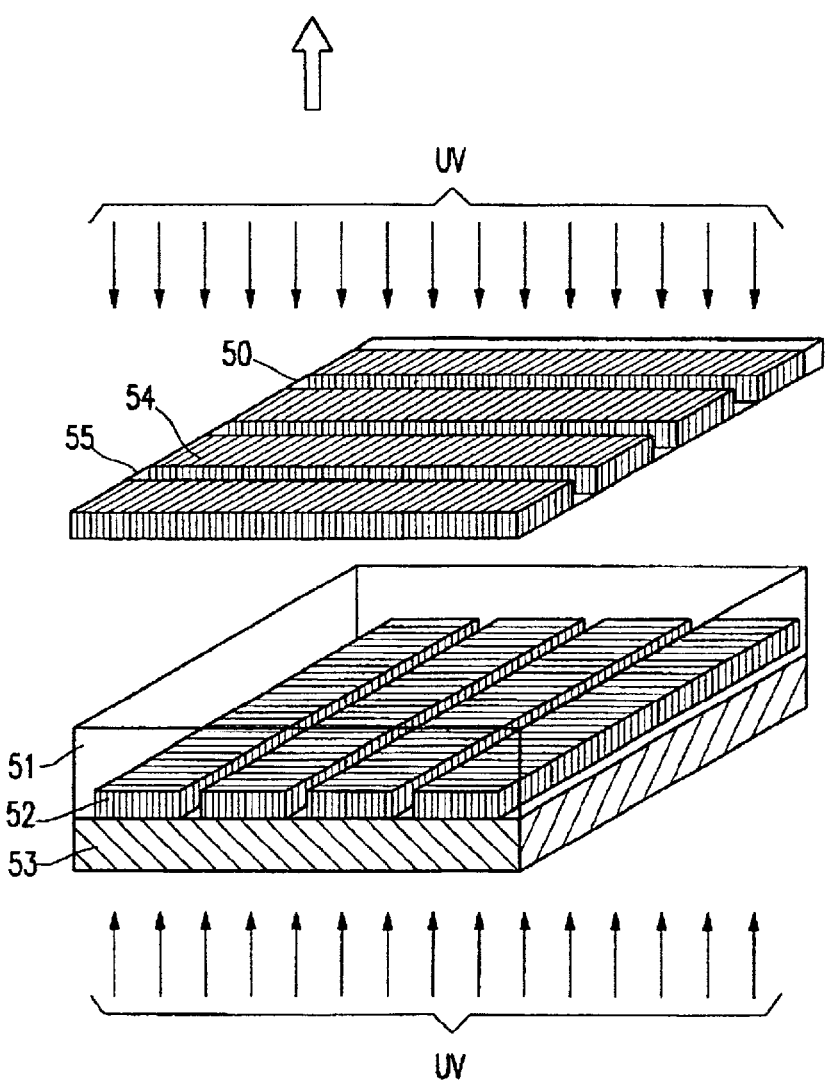
FIG. 5c1

ELECTROPHORETIC DISPLAY AND NOVEL PROCESS FOR ITS MANUFACTURE

BACKGROUND OF THE INVENTION a) Field of the Invention

This invention relates to an electrophoretic display comprising cells of well-defined shape, size and aspect ratio which cells are filled with charged pigment particles dispersed in a solvent, and novel processes for its manufacture.

b) Description of Related Art

The electrophoretic display is a non-emissive device based on the electrophoresis phenomenon of charged pigment particles suspended in a solvent. It was first proposed in 1969. The display usually comprises two plates with electrodes placed opposing each other, separated by using spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

In order to prevent undesired movement of the particles, such as sedimentation, partitions between the two electrodes were proposed for dividing the space into smaller cells. However, in the case of partition-type electrophoretic displays, some difficulties were encountered in the formation of the partitions and the process of enclosing the suspension. Furthermore, it was also difficult to keep different colors of suspensions separate from each other in the partition-type electrophoretic display.

Subsequently, attempts were made to enclose the suspension in microcapsules. U.S. Pat. Nos. 5,961,804 and 5,930,026 describe microencapsulated electrophoretic displays. The reference display has a substantially two dimensional arrangement of microcapsules each having therein an electrophoretic composition of a dielectric fluid and a suspension of charged pigment particles that visually contrast with the dielectric solvent. The microcapsules can be formed by interfacial polymerization, in-situ polymerization or other known methods such as physical processes, in-liquid curing or simple/complex coacervation. The.microcapsules, after their formation, may be injected into a cell housing two spaced-apart electrodes, or "printed" into or coated on a transparent conductor film. The microcapsules may also be immobilized within a transparent matrix or binder that is itself sandwiched between the two electrodes.

The electrophoretic displays prepared by these prior art processes, in particular the microencapsulation process as disclosed in U.S. Pat. Nos. 5,930,026, 5,961,804, and 6,017,584, have many shortcomings. For example, the electrophoretic display manufactured by the microencapsulation process suffers from sensitivity to environmental changes (in particular sensitivity to moisture and temperature) due to the wall chemistry of the microcapsules. Secondly the electrophoretic display based on the microcapsules has poor scratch resistance due to the thin wall and large particle size of the microcapsules. To improve the handleability of the display, microcapsules are embedded in a large quantity of polymer matrix which results in a slow response time due to the large distance between the two electrodes and a low contrast ratio due to the low payload of pigment particles. It is also difficult to increase the surface charge density on the pigment particles because charge-controlling agents tend to diffuse to the water/oil interface during the microencapsulation process. The low charge density or zeta potential of the pigment particles in the microcapsules also results in a slow response rate. Furthermore, because of the large particle size and broad size distribution of the microcapsules, the prior art electrophoretic display of this type has poor resolution and addressability for color applications.

SUMMARY OF THE INVENTION

The first aspect of the present invention is directed to an electrophoretic display comprising cells of well-defined shape, size and aspect ratio. The cells are filled with charged pigment particles dispersed in a dielectric solvent.

Another aspect of the invention relates to a novel process for the manufacture of such an electrophoretic display.

A further aspect of the invention relates to the preparation of cells of well-defined shape, size and aspect ratio. The cells enclose a suspension of charged pigment particles dispersed in a dielectric solvent and are formed from microcups prepared according to the present invention. Briefly, the process for the preparation of the microcups involves embossing a thermoplastic or thermoset precursor layer coated on a conductor film with a pre-patterned male mold, followed by releasing the mold during or after the thermoset precursor layer is hardened by radiation, cooling, solvent evaporation, or other means. Alternatively, the microcups may be formed from imagewise exposure of the conductor film coated with a radiation curable layer followed by removing the unexposed areas after the exposed areas have become hardened.

Solvent-resistant, thermomechanically stable microcups having a wide range of size, shape, and opening ratio can be prepared by either one of the aforesaid methods. The microcups are then filled with a suspension of charged pigment particles in a dielectric solvent, and sealed.

Yet another aspect of the present invention relates to the sealing of the microcups filled with the electrophoretic fluid containing a dispersion of charged pigment particles in a dielectric fluid. Sealing can be accomplished by a variety of ways. Preferably, it is accomplished by dispersing a thermoplastic or thermoset precursor in the electrophoretic fluid before the filling step. The thermoplastic or thermoset precursor is immiscible with the dielectric solvent and has a specific gravity lower than that of the solvent and the pigment particles. After filling, the thermoplastic or thermoset precursor phase separates from the electrophoretic fluid and forms a supernatant layer at the top of the fluid. The sealing of the microcups is then conveniently accomplished by hardening the precursor layer by solvent evaporation, interfacial reaction, moisture, heat, or radiation. UV radiation is the preferred method to seal the microcups, although a combination of two or more curing mechanisms as described above may be used to increase the throughput of sealing. Alternatively, the sealing can be accomplished by overcoating the electrophoretic fluid with a solution containing the thermoplastic or thermoset precursor. The sealing is then accomplished by hardening the precursor by solvent evaporation, interfacial reaction, moisture, heat, radiation, or a combination of curing mechanisms. These sealing processes are especially unique features of the present invention.

Yet another aspect of the present invention relates to a multiple step process for the manufacture of a monochrome electrophoretic display comprising cells having well-defined shape and size. The processing steps include preparation of the microcups by any one of the methods described above, sealing of the microcups, and finally laminating the sealed array of microcups with a second conductor film pre-coated with an adhesive layer. This multiple-step process can be carried out roll to roll continuously.

Yet another aspect of the present invention relates to a process for the manufacture of a full color electrophoretic display by laminating the preformed microcups with a layer of positively working photoresist, selectively opening a certain number of the microcups by imagewise exposing the positive photoresist, followed by developing the resist, filling the opened cups with a colored electrophoretic fluid, and sealing the filled microcups by a sealing process. These steps may be repeated to create sealed microcups filled with electrophoretic fluids of different colors.

These multiple-step processes as disclosed may be carried out roll-to-roll continuously or semi-continuously. Consequently, they are suitable for high volume and low cost production. These processes are also efficient and inexpensive as compared to other processes for high volume production operations. The electrophoretic display prepared according to the present invention is not sensitive to environment, particularly humidity and temperature. The display is thin, flexible, durable, easy-to-handle, and format-flexible. Since the electrophoretic display prepared according to the present invention comprises cells of favorable aspect ratio and well-defined shape and size, the bistable reflective display has excellent color addressability, high contrast ratio, and fast switching rate. The drawbacks of electrophoretic displays prepared by the prior art processes are therefore all eliminated.

BRIEF DESCRIPTION OF THE DRAWINGS

FIGS. 4a–4c show a typical microcup array prepared by microembossing.

FIGS. 5a–5c show alternative processing steps for preparing the microcups involving imagewise exposure of the conductor film coated with a thermoset precursor to UV radiation.:

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like indentations created by microembossing or imagewise exposure.

The term "cell", in the context of the present invention, is intended to mean the single unit formed from a sealed microcup. The cells are filled with charged pigment particles dispersed in a solvent or solvent mixture.

The term "well-defined", when describing the microcups or cells, is intended to indicate that the microcup or cell has a definite shape, size and aspect ratio which are pre-determined according to the specific parameters of the manufacturing process.

The term "aspect ratio" is a commonly known term in the art of electrophoretic displays. In this application, it refers to the depth to width or depth to length ratio of the microcups.

Preferred Embodiments

Figure 1:
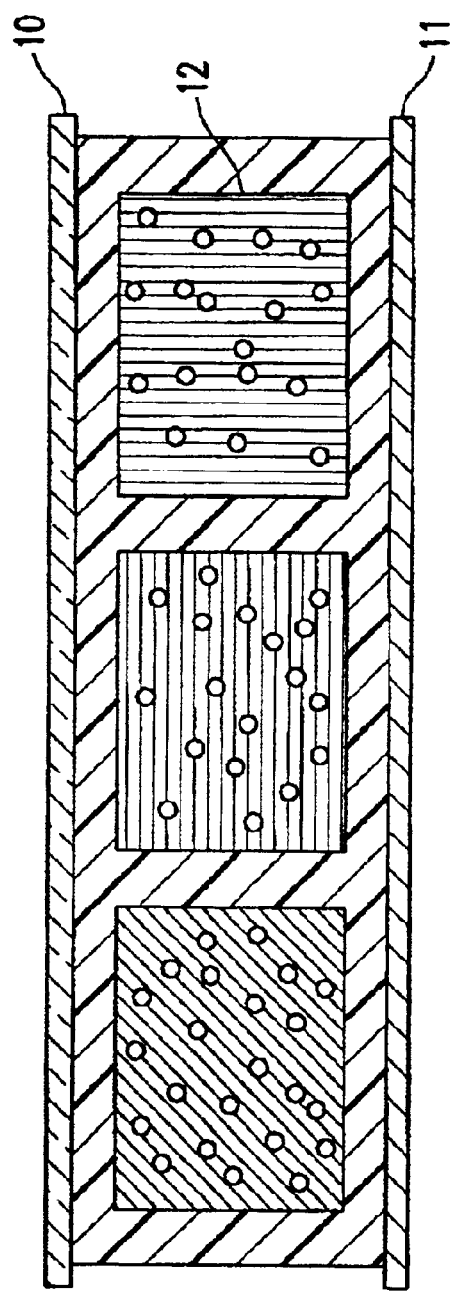
FIG. 1 is a schematic depiction of the electrophoretic display of the present invention.

An electrophoretic display of the present invention, as shown in FIG. 1, comprises two electrode plates (10, 11), at least one of which is transparent (10), and a layer of well-defined cells (12) enclosed between the two electrodes. The cells are of well-defined shape and size and are filled with charged pigment particles dispersed in a colored dielectric solvent. When a voltage difference is imposed between the two electrodes, the charged particles migrate to one side, such that either the color of the pigment or the color of the solvent is seen through the transparent conductor film. At least one of the two conductors is patterned. The process for the preparation of such an electrophoretic display involves several aspects.

I. PREPARATION OF THE MICROCUPS

I(a) Preparation of the Microcups by Embossing

Figure 2A:
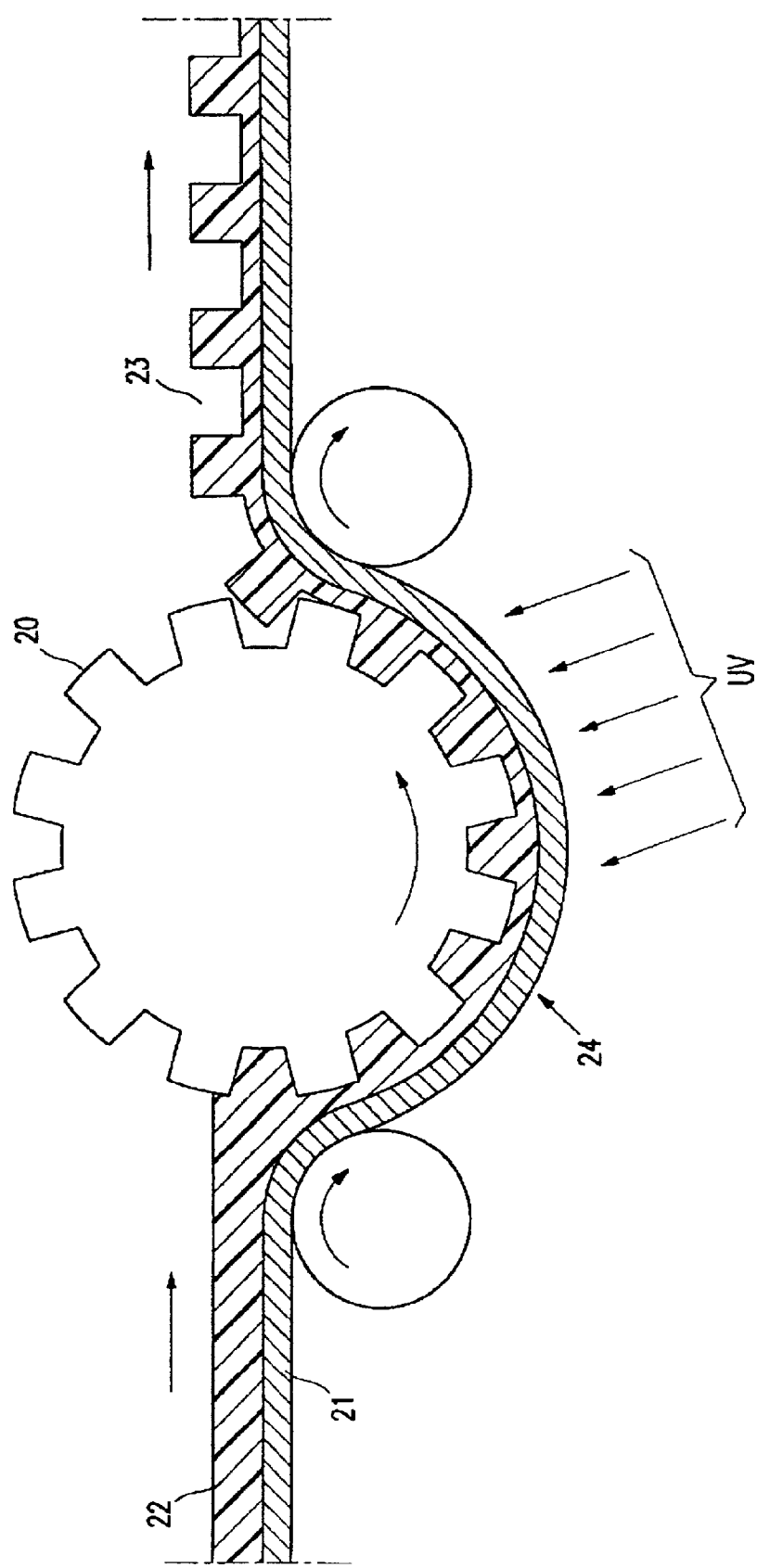
FIGS. 2a and 2b show the roll to roll process for the manufacture of an electrophoretic display, in particular, the creation of microcups by embossing a conductor film coated with a UV curable composition.
Figure 2B:
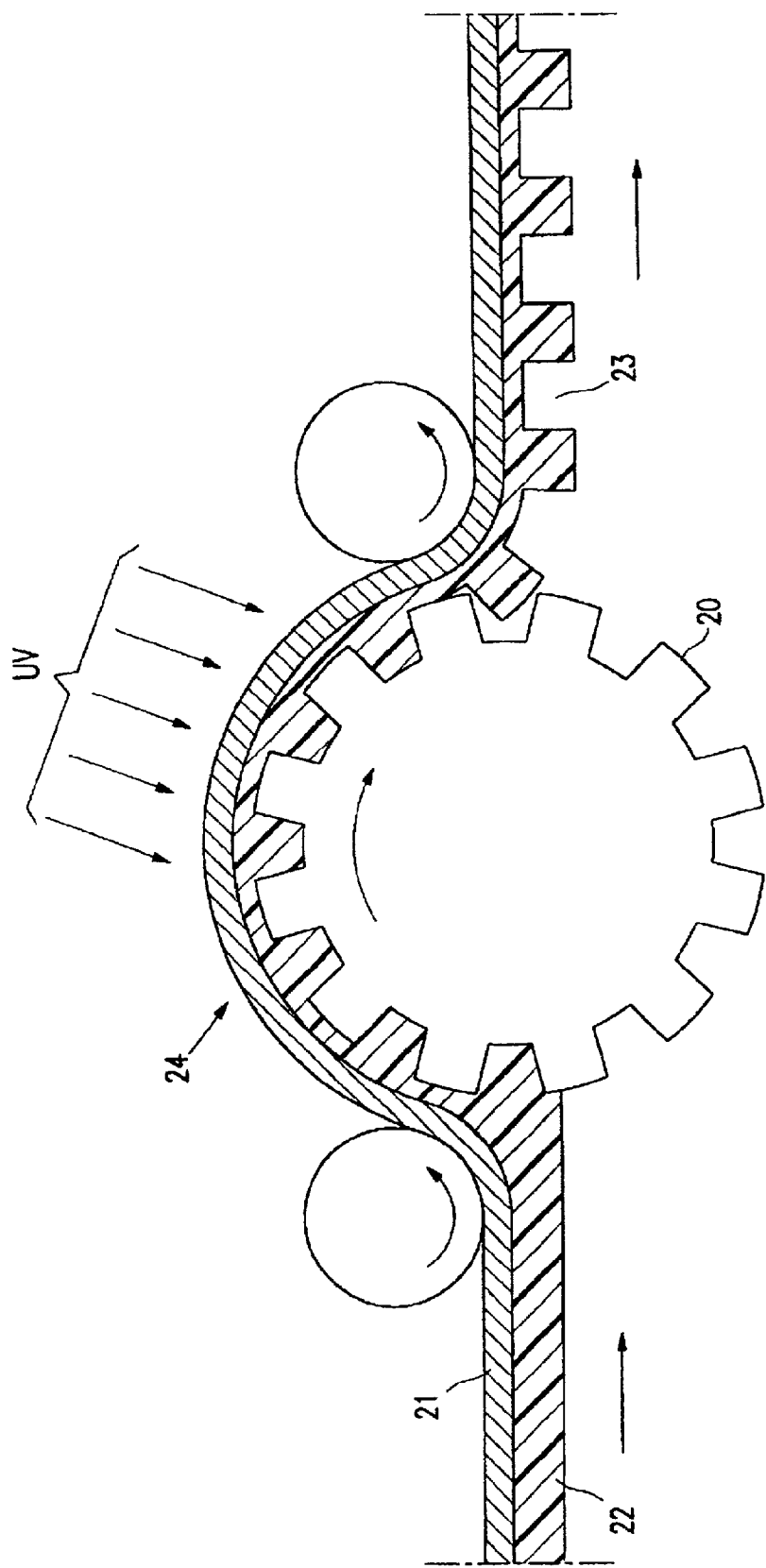

This processing step is shown in FIGS. 2a and 2b. The male mold (20) may be placed either above (FIG. 2a) or below (FIG. 2b) the web (24). The transparent conductive substrate is constructed by forming a transparent conductor film (21) on a glass plate or a plastic substrate. A layer of a thermoplastic or thermoset precursor (22) is then coated on the conductor film. The thermoplastic or thermoset precursor layer is embossed at a temperature higher than the glass transition temperature of the thermoplastic or thermoset precursor layer by the male mold in the form of a roller, plate or belt.

The thermoplastic or thermoset precursor for the preparation of the microcups, may be multifunctional acrylate or methacrylate, vinylether, epoxide and their oligomers, polymers and the like. Multifunctional acrylate and their oligomers are the most preferred. A combination of multifunctional epoxide and multifunctional acrylate is also very useful to achieve desirable physico-mechanical properties. A crosslinkable oligomer imparting flexibility, such as urethane acrylate or polyester acrylate, is usually also added to improve the flexure resistance of the embossed micro-cups. The composition may contain polymer, oligomer, monomer and additives or only oligomer, monomer and additives. The glass transition temperatures (or Tg) for this class of materials usually range from about −70° C. to about 150° C., preferably from about −20° C. to about 50° C. The microembossing process is typically carried out at a temperature higher than the Tg. A heated male mold or a heated housing substrate against which the mold presses may be used to control the microembossing temperature and pressure.

As shown in FIGS. 2a and 2b, the mold is released during or after the precursor layer is hardened to reveal an array of microcups (23). The hardening of the precursor layer may be accomplished by cooling, cross-linking by radiation, heat or moisture. If the curing of the thermoset precursor is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the thermoset precursor layer.

Preparation of the Male Mold

Figure 3A:
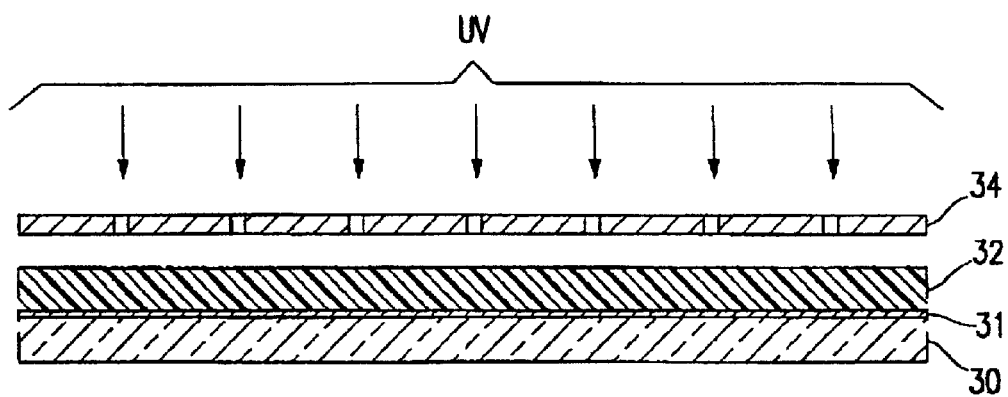
FIGS. 3a–3d illustrate a typical method of preparing the male mold for microembossing.
Figure 3B:
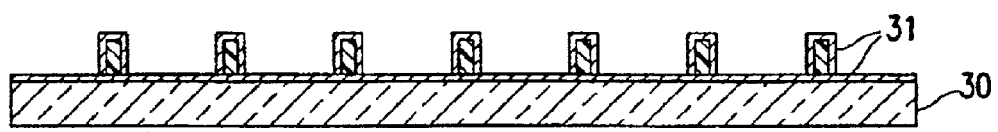
Figure 3C:
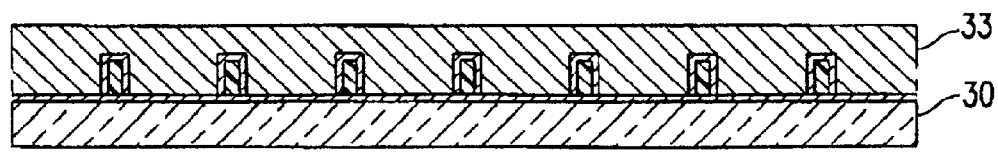
Figure 3D:
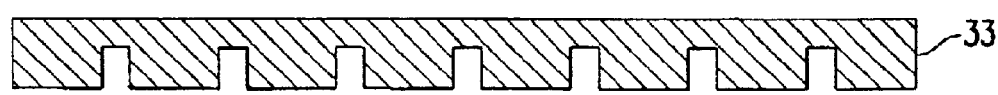

The male mold may be prepared by a photoresist process followed by either etching or electroplating. A representative example for the preparation of the male mold is given in FIG. 3. With electroplating (FIG. 3a), a glass base (30) is sputtered with a thin layer (typically 3000 Å) of a seed metal (31) such as chrome inconel. It is then coated with a layer of photoresist (32) and exposed to UV. A mask (34) is placed between the UV and the layer of photoresist (32). The exposed areas of the photoresist become hardened. The unexposed areas are then removed by washing them with an appropriate solvent. The remaining hardened photoresist is dried and sputtered again with a thin layer of seed metal. A master (FIG. 3b) is then ready for electroforming. A typical material used for electroforming is nickel cobalt (33). Alternatively, the master can be made of nickel by nickel sulfamate electroforming or electroless nickel deposition as described in "Continuous manufacturing of thin cover sheet optical media", SPIE Proc. Vol. 1663, pp.324 (1992). The floor of the mold (FIG. 3d) is typically between 50 to 400 microns. The master can also be made using other microengineering techniques including e-beam writing, dry etching, chemical etching, laser writing or laser interference as described in "Replication techniques for micro-optics", SPIE Proc. Vol.3099, pp76–82 (1997). Alternatively, the mold can be made by photomachining using plastics, ceramics or metals.

FIG. 4a is an optical profilometry three-dimensional profile of the typical microcups prepared by microembossing. FIG. 4b is an optical microscopic picture showing the openings of the microcups from the top view. FIG. 4c is the optical profilometry vertical cross-section view of a row of microcups showing their depth.

I(b) Preparation of the Microcups by Imagewise Exposure

Alternatively, the microcups may be prepared by imagewise exposure (FIG. 5a) of a radiation curable material (51) coated on the conductor film (52) to UV or other forms of radiation through a mask (50). The conductor film (52) is on a plastic substrate (53).

For a roll-to-roll process, the photomask may be synchronized with the web and move at the same speed as the latter. In the photomask (50) in FIG. 5a, the dark squares (54) represent the opaque area and the space (55) between the dark squares represents the opening area. The UV radiates through the opening area (55) onto the radiation curable material. The exposed areas become hardened and the unexposed areas (protected by the opaque area in the mask) are then removed by an appropriate solvent or developer to form the microcups (56). The solvent or developer is selected from those commonly used for dissolving or reducing the viscosity of radiation curable materials such as methylethylketone, toluene, acetone, isopropanol or the like.

FIGS. 5b and 5c illustrate two other options for the preparation of microcups by imagewise exposure. The features in these two figures are essentially the same as shown in FIG. 5a and the corresponding parts are also numbered the same. In FIG. 5b, the conductor film (52) used is opaque and pre-patterned. In this case, it may be advantageous to imagewise expose the radiation sensitive material through the conductor pattern which serves as the photomask. The microcups (56) can then be formed by removing the unexposed areas after UV radiation. In FIG. 5c, the conductor film (52) is also opaque and line-patterned. The radiation curable material is exposed from the bottom through the conductor line pattern (52) which serves as the first photomask. A second exposure is performed from the other side through the second photomask (50) having a line pattern perpendicular to the conductor lines. The unexposed area is then removed by a solvent or developer to reveal the microcups (56).

In general, the microcups can be of any shape, and their sizes and shapes may vary. The microcups may be of substantially uniform size and shape in one system. However, in order to maximize the optical effect, microcups having a mixture of different shapes and sizes may be produced. For example, microcups filled with a dispersion of the red color may have a different shape or size from the green microcups or the blue microcups. Furthermore, a pixel may consist of different numbers of microcups of different colors. For example, a pixel may consist of a number of small green microcups, a number of large red microcups, and a number of small blue microcups. It is not necessary to have the same shape and number for the three colors.

The openings of the microcups may be round, square, rectangular, hexagonal, or any other shape. The partition area between the openings is preferably kept small in order to achieve a high color saturation and contrast while maintaining desirable mechanical properties. Consequently the honeycomb-shaped opening is preferred over, for example, the circular opening.

For reflective electrophoretic displays, the dimension of each individual microcup may be in the range of about $10^2$ to about $5 \times 10^5$ $\mu m^2$, preferably from about $10^3$ about $5 \times 10^4$ $\mu m^2$. The depth of the microcups is in the range of about 3 to about 100 microns, preferably from about 10 to about 50 microns. The opening to wall ratio is in the range of from about 0.05 to about 100, preferably from about 0.4 to about 20. The distances of the openings usually are in the range of from about 15 to about 450 microns, preferably from about 25 to about 300 microns from edge to edge of the openings.

II. Preparation of the Suspension/Dispersion

The microcups are filled with charged pigment particles dispersed in a dielectric solvent. The dispersion may be prepared according to methods well known in the art such as U.S. Pat. Nos. 6,017,584, 5,914,806, 5,573,711, 5,403,518, 5,380,362, 4,680,103, 4,285,801, 4,093,534, 4,071,430, 3,668,106 and *IEEE Trans. Electron Devices*, ED-24, 827 (1977), and *J. Appl. Phys.* 49(9), 4820 (1978). The charged pigment particles visually contrast with the medium in which the particles are suspended. The medium is a dielectric solvent which preferably has a low viscosity and a dielectric constant in the range of about 2 to about 30, preferably about 2 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene, and perfluoro solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del. In one preferred embodiment, poly (chlorotrifluoroethylene) is used as the dielectric solvent. In another preferred embodiment, poly(perfluoropropylene oxide) is used as the dielectric solvent.

The suspending medium may be colored by dyes or pigments. Nonionic azo and anthraquinone dyes are particularly useful. Examples of useful dyes include, but are not limited to: Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthroquinone blue, anthroquinone yellow 114, anthroquinone red 111, 135, anthroquinone green 28 from Aldrich. In case of an insoluble pigment, the pigment particles for generating the color of the medium may also be dispersed in the dielectric medium. These color particles are preferably uncharged. If the pigment particles for generating color in the medium are charged, they preferably carry a charge which is opposite from that of the charged pigment particles. If both types of pigment particles carry the same charge, then they should have different charge density or different electrophoretic mobility. In any case, the dye or pigment for generating color of the medium must be chemically stable and compatible with other components in the suspension.

The charged pigment particles may be organic or inorganic pigments, such as $TiO_2$, phthalocyanine blue, phthalocyanine green, diarylide yellow, diarylide AAOT Yellow, and quinacridone, azo, rhodamine, perylene pigment series from Sun Chemical, Hansa yellow G particles from Kanto Chemical, and Carbon Lampblack from Fisher. Submicron particle size is preferred. The particles should have acceptable optical characteristics, should not swollen or softened by the dielectric solvent, and should be chemically stable. The resulting suspension must also be stable against sedimentation, creaming or flocculation under normal operating conditions.

The pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may al'so be ionic or non-ionic, including ionic surfactants such as Aerosol TO, sodium dodecylbenzenesulfonate, metal soap, polybutene succinimide, maleic anhydride copolymers, vinylpyridine copolymers, vinylpyrrolidone copolymer (such as Ganex from International Specialty Products), (meth)acrylic acid copolymers, N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and UR from Dupont.

Suitable charged pigment dispersions may be manufactured by any of the well-known methods including grinding, milling, attriting, microfluidizing, and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the suspending medium may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

For a black/white electrophoretic display, the suspension comprises charged white particles of titanium oxide ($TiO_2$) dispersed in a black solvent or charged black particles dispersed in a dielectric solvent. A black dye or dye mixture such as Pylam Spirit Black and Fast Spirit Black from Pylam Products Co. Arizona, Sudan Black B from Aldrich, Thermoplastic Black X-70 from BASF, or an insoluble black pigment such as carbon black may be used to generate the black color of the solvent. For other colored suspensions, there are many possibilities. For a subtractive color system, the charged $TiO_2$ particles may be suspended in a dielectric solvent of cyan, yellow or magenta color. The cyan, yellow or magenta color may be generated via the use of a dye or a pigment. For an additive color system, the charged $TiO_2$ particles may be suspended in a dielectric solvent of red, green or blue color generated also via the use of a dye or a pigment. The red, green, blue color system is preferred for most applications.

III. Sealing of the Microcups

The sealing of the microcups may be accomplished in a number of ways. A preferred approach is to disperse a UV curable composition containing multifunctional acrylates, acrylated oligomers, and photoinitiators into an electrophoretic fluid containing charged pigment particles dispersed in a colored dielectric solvent. The UV curable composition is immiscible with the dielectric solvent and has a specific gravity lower than that of the dielectric solvent and the pigment particles. The two components, UV curable composition and the electrophoretic fluid, are thoroughly blended in an in-line mixer and immediately coated onto the microcups with a precision coating mechanism such as Myrad bar, gravure, doctor blade, slot coating or slit coating. Excess fluid is scraped away by a wiper blade or a similar device. A small amount of a weak solvent or solvent mixture such as isopropanol, methanol, or their aqueous solutions may be used to clean the, residual electrophoretic fluid on the top surface of the partition walls of the microcups. Volatile organic solvents may be used to control the viscosity and coverage of the electrophoretic fluid. The thus-filled microcups are then dried and the UV curable composition floats to the top of the electrophoretic fluid. The microcups may be sealed by curing the supernatant UV curable layer during or after it floats to the top. UV or other forms of radiation such as visible light, IR and electron beam may be used to cure and seal the microcups. Alternatively, heat or moisture may also be employed to cure and seal the microcups, if appropriate, heat or moisture curable compositions may be used.

A preferred group of dielectric solvents exhibiting desirable density and solubility discrimination against acrylate monomers and oligomers are halogenated hydrocarbons and their derivatives. Surfactants may be used to improve the adhesion and wetting at the interface between the electrophoretic fluid and the sealing materials. Useful surfactants include the FC surfactants from 3M Company, Zonyl fluorosurfactants from DuPont, fluoroacylates, fluoromethacrylates, fluoro-substituted long chain alcohols, perfluoro-substituted long chain carboxylic acids and their derivatives.

Alternatively, the electrophoretic fluid and the sealing precursor may be coated sequentially into the microcups, if the sealing precursor is at least partially compatible with the dielectric solvent. Thus, the sealing of the microcups may be accomplished by overcoating a thin layer of thermoset precursor which is curable by radiation, heat, moisture or interfacial reactions and curing on the surface of the filled microcups. Interfacial polymerization followed by UV curing is very beneficial to the sealing process. Intermixing between the electrophoretic layer and the overcoat is significantly suppressed by the formation of a thin barrier layer at the interface by interfacial polymerization. The sealing is then completed by a post curing step, preferably by UV radiation. To further reduce the degree of intermixing, it is highly desirable that the specific gravity of the overcoating is significantly lower than that of the electrophoretic fluid. Volatile organic solvents may be used to adjust the viscosity and the thickness of the coatings. When a volatile solvent is used in the overcoat, it is preferred that it is immiscible with the dielectric solvent. The two-step overcoating process is particularly useful when the dye used is at least partially soluble in the thermoset precursor.

IV. PREPARATION OF MONOCHROME ELECTROPHORETIC DISPLAYS

Figure 6:
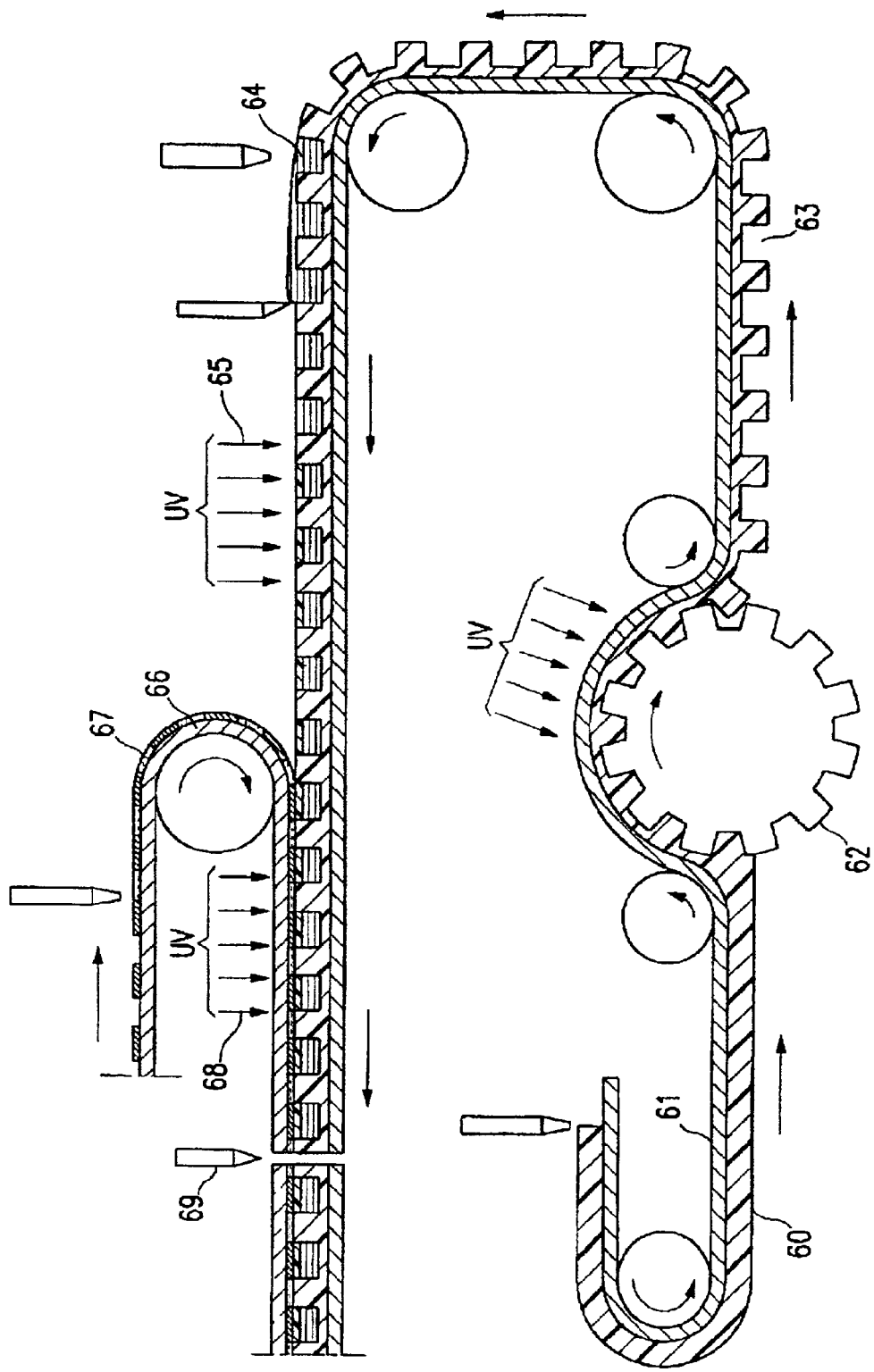
FIG. 6 is a flow chart for manufacturing a black/white electrophoretic display or other single color electrophoretic displays.
Figure 7A:
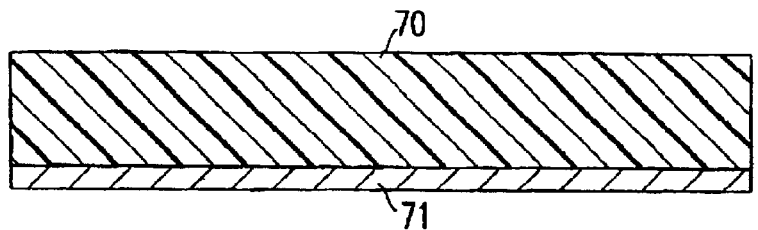
FIGS. 7a–7h are a flow chart for manufacturing a multi-color electrophoretic display.
Figure 7B:
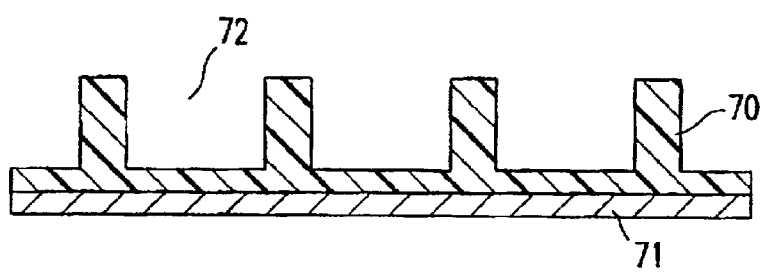
Figure 7C:
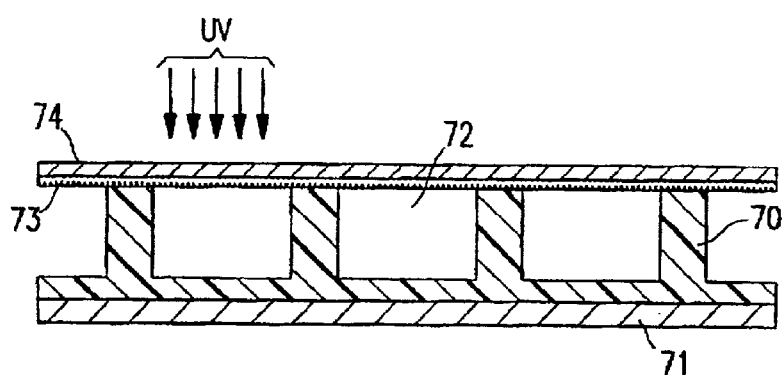
Figure 7D:
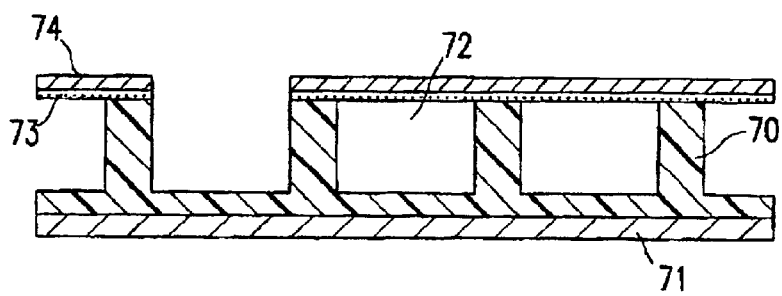
Figure 7E:
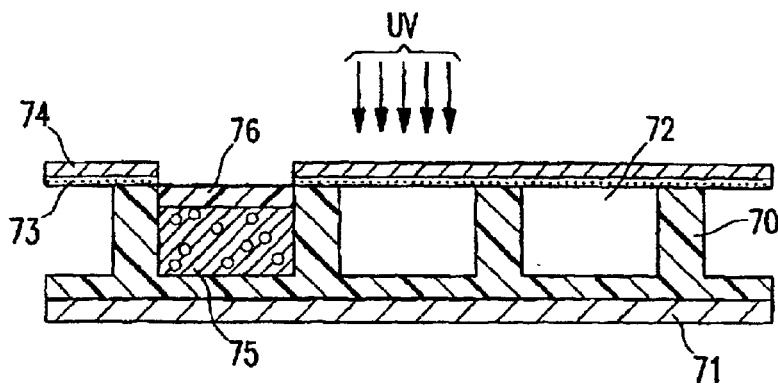
Figure 7F:
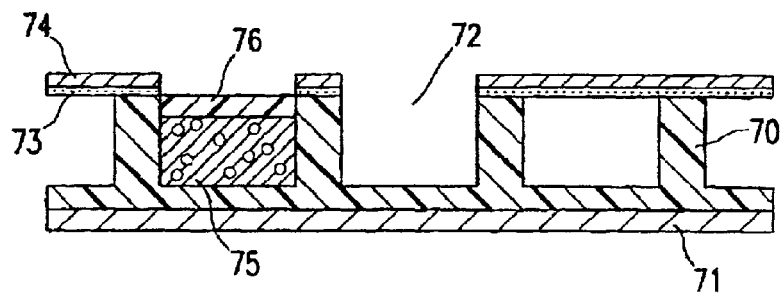
Figure 7G:
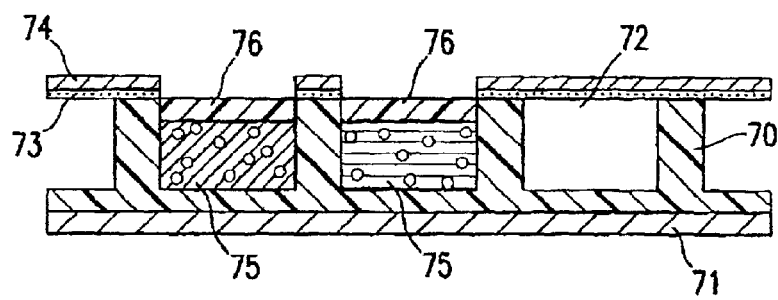
Figure 7H:
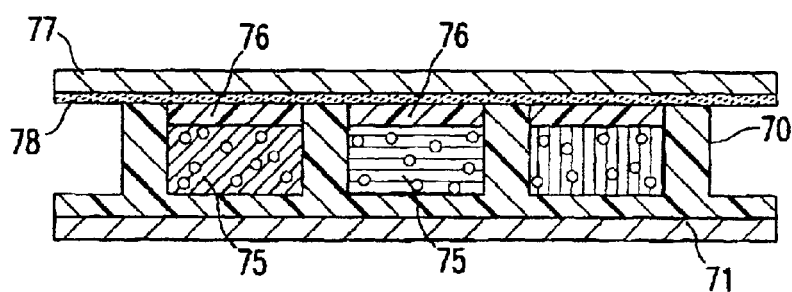

The process is illustrated by the flow diagram as shown in FIG. 6. All microcups are filled with a suspension of the same color composition. The process can be a continuous roll-to-roll process comprising the following steps:

1. Coat a layer of thermoplastic or thermoset precursor (60) optionally with a solvent on a conductor film (61). The solvent, if present, readily evaporates.
2. Emboss the thermoplastic or thermoset precursor layer at a temperature higher than the glass transition temperature of the thermoset precursor layer by a pre-patterned male mold (62).
3. Release the mold from the thermoplastic or thermoset precursor layer preferably during or after it is hardened by proper means.
4. Fill in the thus-formed array of microcups (63) with a charged pigment dispersion (64) in a colored dielectric solvent containing at least a thermoset precursor which is incompatible with the solvent and has a lower specific gravity than the solvent and the pigment particles.
5. Seal the microcups by curing the thermoset precursor preferably by radiation such as UV (65), or by heat or moisture during or after the thermoset precursor separates and forms a supernatant layer on top of the liquid phase, thus forming closed electrophoretic cells containing pigment dispersion in a colored dielectric solvent.
6. Laminate the sealed array of electrophoretic cells with a second conductor film (66) pre-coated with an adhesive layer (67) which may be a pressure sensitive adhesive, a hot melt adhesive, a heat, moisture, or radiation curable adhesive.

The laminate adhesive may be post cured by radiation such as UV (68) through the top conductor film if the latter is transparent to the radiation. The finished product may be cut (69) after the lamination step.

The preparation of the microcups described above can be conveniently replaced by the alternative procedure of imagewise exposing the conductor film coated with a thermoset precursor followed by removing the unexposed areas by an appropriate solvent. The sealing of the microcups may alternatively be accomplished by directly overcoating and curing a layer of the thermoset precursor composition over the surface of the electrophoretic fluid.

V. PREPARATION OF MULTI-COLOR ELECTROPHORETIC DISPLAYS

For the manufacture of a multi-color electrophoretic display, additional steps are needed to generate microcups containing suspensions of different colors. These additional steps include (1) laminating the already formed microcups with a positively working dry-film photoresist consisting of at least a removable support such as PET-4851 from Saint-Gobain, Worcester, Mass., a novolac positive photoresist such as Microposit S1118 from Shipley, and an alkali-developable adhesive layer such as a mixture of Nacor 72-8685 from National Starch and Carboset 515 from BF Goodrich; (2) selectively opening a certain amount of the microcups by imagewise exposing the photoresist, removing the removable support film, and developing the positive photoresist with a developer such as diluted Microposit 351 developer from Shipley; (3) filling the opened cups with the electrophoretic fluid containing charged white pigment ($TiO_2$) particles and dye or pigment of the first primary color; and (4) sealing the filled microcups as described in the preparation of monochrome displays. These additional steps may be repeated to create microcups filled with electrophoretic fluid of the second and the third primary colors.

More specifically, a multi-color electrophoretic displays may be prepared according to the steps as shown in FIG. 7:
1. Coat a layer of thermoset precursor (70) on a conductor film (71).
2. Emboss the thermoplastic or thermoset precursor layer at a temperature higher than its glass transition temperature by a pre-patterned male mold (not shown).
3. Release the mold from the thermoplastic or thermoset precursor layer preferably during or after it is hardened by cooling or crosslinking by radiation, heat or moisture.
4. Laminate the thus formed array of microcups (72) with a positive dry-film photoresist which comprises at least an adhesive layer (73), a positive photoresist (74) and a removable plastic cover sheet (not shown).
5. Imagewise expose (FIG. 7c) the positive photoresist by UV, visible light, or other radiation, remove the cover sheet, develop and open cups in the exposed area. The purpose of Steps 4 and 5 is to selectively open the microcups in a predetermined area (FIG. 7d).
6. Fill in the opened microcups with a charged white pigment dispersion (75) in a dielectric solvent containing at least a dye or pigment of the first primary color and a thermoset precursor (76) which is incompatible with the solvent and has a lower specific gravity than the solvent and the pigment particles.
7. Seal the microcups to form closed electrophoretic cells containing electrophoretic fluid of the first primary color by curing the thermoset precursor (preferably by radiation such as UV, less preferably by heat or moisture) during or after the thermoset precursor separates and forms a supernatant layer on top of the liquid phase (FIG. 7e).
8. Steps 5–7 described above may be repeated to generate well-defined cells containing electrophoretic fluids of different colors in different areas (FIGS. 7e, 7f and 7g).
9. Laminate the sealed array of electrophoretic cells in registration to a second, pre-patterned transparent conductor film (77) pre-coated with an adhesive layer (78) which may be a pressure sensitive adhesive, a hot melt adhesive, a heat, moisture, or radiation curable adhesive.
10. Harden the adhesive.

The preparation of the microcups described in the process above can conveniently be replaced by the alternative procedure of imagewise exposing the conductor film coated with a thermoset precursor followed by removing the unexposed areas by an appropriate solvent. The sealing of the microcups may be alternatively accomplished by directly coating a layer of the thermoset precursor material over the surface of the liquid phase.

The thickness of the display produced by the present processes as described can be as thin as a piece of paper. The width of the display is the width of the coating web (typically 3–90 inches). The length of the display can be anywhere from inches to thousands of feet depending on the size of the roll.

EXAMPLES

The following examples are given to enable those skilled in the art to more clearly understand and to practice the present invention. They should not be considered as limiting the scope of the invention, but merely as being illustrative and representative thereof.

Example 1

Preparation of Microcups by Microembossing

The composition shown in Table 1 is coated onto Mylar J101/200 gauge using a Nickel Chrome bird type film applicator with an opening of 3 mil. The solvent is allowed to evaporate leaving behind a tacky film with a Tg below room temperature.

TABLE 1

PMMA-containing composition for microembossing

| No. | Description | Ingredient | Supplier | Wt % |
|---|---|---|---|---|
| 1 | Epoxy acrylate | Ebecryl 3605 | UCB Chemicals | 7.35 |
| 2 | Monomer | Sartomer SR205 | Sartomer | 9.59 |
| 3 | Urethane acrylate | Ebecryl 6700 | UCB Chemicals | 4.87 |
| 4 | Polymethyl-methacrylate | Elvacite 2051 | ICI | 9.11 |
| 5 | Photoinitiator | Darocur 1173 | Ciba | 1.45 |
| 6 | Cationic photoinitiator | Cyracure UVI 6976 | Union Carbide | 0.60 |
| 7 | Solvent | Acetone | Aldrich | 67.03 |
|   |   |   | Total | 100.00 |

A pre-patterned stencil from Photo Stencil, Colorado Springs, Colo., was used as the male mold for microembossing and Frekote 700-NC from Henkel was used as the mold release. The coated film was then embossed by the stencil using a pressure roller at room temperature. The coating was then UV cured for about 20 minutes through the Mylar film using a Loctite Zeta 7410 exposure unit equipped with a metal fluoride lamp with an intensity of 80 mW/cm$^2$ at 365 nm. The embossed film was then released from the mold to reveal well-defined microcups having lateral dimensions ranging from 60 µm to 120 µm (200–400 dpi) and a depth ranging from 5 µm to 30 µm as measured by optical profilometry and microscope (FIGS. 4a–4c).

Example 2

A composition containing solid oligomer, monomer and additive is shown in Table 2. The glass transition temperature of the mixture is again below room temperature. The tacky coating is deposited on top of Mylar J101/200 gauge as before. Embossing can be conducted at 32° C. and 60° C. using a heated pressure roller or laminator. Well-defined high resolution microcups (100–400 dpi) with depth ranging from 5–30 microns were produced.

TABLE 2

Embossing composition containing oligomer, monomer, additive and solvent

| No. | Description | Ingredient | Supplier | Wt % |
|---|---|---|---|---|
| 1 | Epoxy acrylate | Ebecryl 3903 | UCB Chemicals | 17.21 |
| 2 | Monomer | HDODA | UCB Chemicals | 8.61 |
| 3 | Urethane acrylate | Ebecryl 4827 | UCB Chemicals | 2.87 |
| 4 | Photoinitiator | Irgacure 500 | Ciba | 1.43 |
| 5 | Slip | Ebecryl 1360 | UCB Chemicals | 1.60 |
| 6 | Solvent | Acetone | Aldrich | 68.26 |
|   |   |   | Total | 100 |

Example 3

Preparation of Pigment Dispersion in Dielectric Solvent

Polystyrene (0.89 grams, Polysciences, Inc., mw. 50,000) and AOT (0.094 grams, American Cyanamide, sodium dioctylsulfosuccinate) were dissolved in 17.77 grams of hot xylene (Aldrich). Ti-Pure R-706 (6.25 grams) was added to the solution and ground in an attritor at 200 rpm for more than 12 hours. A low viscosity, stable dispersion was obtained. Oil-blue N (0.25 grams, Aldrich) was added to color the dispersion. The suspension was then tested in a standard electrophoretic cell comprising two ITO conductor plates separated by a 24 microns spacer. High contrast, alternating white and blue images were observed with a switching rate of about 60 Hz and a rising time of 8.5 msec at 80 volts.

Example 4

The experiment of Example 3 was repeated, except Oil Red EGN (Aldrich) and an electrophoretic cell with a 24 micron spacer were used. High contrast, alternating red and white images were observed with a switching rate of 60 Hz and a rising time of 12 msec at 60 volts.

Example 5

Ti-Pure R-706 (1.12 grams) was ground by an attritor in a solution containing 11.2 grams of a maleic anhydride copolymer (Baker Hughes X-5231), 24 grams of 3,4-dichlorobenzotrifluoride, and 24 grams of 1,6-dichlorohexane (both from Aldrich). Similarly, 12 grams of carbon black were ground in a solution containing 1.2 grams of alkylated polyvinylpyrrolidone (Ganex V216 from ISP), 34 grams of 3,4-dichlorobenzotrifluoride, and 34 grams of 1,6-dichlorohexane (Aldrich) at 100° C. These two dispersions were then mixed homogeneously and tested. High contrast black and white images were observed with a switching rate up to 10 Hz and a rising time of about 36 msec at 100 volts.

Example 6

Sealing the Microcups by One-step Process 0.05 Milliliter of UV curable composition comprising 1 wt % of benzil dimethyl ketal (Esacure KB1 from Sartomer) in HDDA (1,6-hexanediol diacrylate from Aldrich) were dispersed into 0.4 ml of a dielectric solvent comprising 0.5 wt % of 2,2,3,3,4,4,5,5,6,6,7,7,8,8,9,9,10,10,10-nonadecafluoro-1-decanol (Aldrich) in FC-43 from 3M Company. The resultant dispersion was then immediately filled into an array of microcups as prepared in Example 2. Excess of fluid was scrapped away by a wiper blade. The HDDA solution was allowed to phase separate for at least 30 seconds and cured by UV radiation (10 mw/cm2) for about 1 minute. A hard, clear layer was observed on the top of the microcups and the microcups were sealed.

Example 7

Sealing the Microcups by a Two-step (Overcoating and UV Curing) Process

The elctrophoretic fluid prepared in Example 5 was coated onto the microcup array as prepared in Example 2. A thin layer of Norland optical adhesive NOA 60 (Norland Products Inc., New Brunswick, N.J.) was coated onto the filled microcups. Any excess of the UV adhesive was scrapped off by a strip of Mylar film and cleaned by a piece of absorbing paper. The overcoated adhesive was then cured immediately under a Loctite Zeta 7410 UV exposure unit for about 15 minutes. The microcups were sealed completely and no air pocket was observed. The thickness of cured adhesive layer was about 5–10 microns as measured by a Mitutoyo thickness gauge.

Example 8

Sealing the Microcups by a Two-step (Overcoating and Moisture Curing) Process

The experiment of Example 7 was repeated, except the Norland adhesive was replaced by Instant Krazy glue from Elmer's Products, Inc., Columbus, Ohio. The overcoated adhesive was then cured for 5 minutes by moisture in air. The microcups were sealed completely and no air pocket was observed. The thickness of cured adhesive layer was about 5–10 microns as measured by a Mitutoyo thickness gauge.

Example 9

Sealing the Microcups by a Two-step (Overcoating and Interfacial Polymerization) Process The experiment of Example 8 was repeated, except the electrophoretic fluid was replaced by a 3,4-dichlorobenzotrifluoride solution containing 0.3 wt % of tetraethylenepentaamine (Aldrich) and the Instant Krazy glue was replaced by an aliphatic polyisocyanate (Desmodur N 3300 from Bayer Corp.) solution in anhydrous ether. A highly crosslinked thin film was observed almost immediately after overcoating. The dielectric solvent was completely sealed inside the microcups after ether was evaporated at room temperature. No air pocket was observed.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A process for the preparation of an array of well-defined cells used in an electrophoretic display, which process comprises the steps of:
   a) filling an array of microcups with a dielectric fluid containing a mixture of dispersions in a dielectric solvent or solvent mixture, said mixture of dispersions comprising at least a suspension of charged pigment particles and a dispersion of a thermoset precursor composition which has a specific gravity lower than that of the dielectric solvent or solvent mixture; and
   b) sealing the array of filled microcups to form the array of well-defined cells by curing the thermoset precursor composition during or after it phase separates and forms a supernatant layer above the dielectric solvent or solvent mixture.

2. The process of claim 1 wherein the thermoset precursor composition comprises a material selected from the group consisting of polyvalent acrylate, polyvalent methacrylate, cyanoacrylate, polyvalent vinyl, polyvalent epoxide, polyvalent isocyanate, polyvalent allyl, and oligomers or polymers containing crosslinkable functional groups.

3. The process of claim 2 wherein said polyvalent vinyl is vinylbenzene, vinylsilane or vinylether.

4. The process of claim 1 wherein the dielectric solvent or solvent mixture has a dielectric constant ranging from about 2 to about 30.

5. The process of claim 1 wherein the dielectric solvent or solvent mixture comprises at least a dispersion of white pigment particles dispersed in said dielectric solvent or solvent mixture colored by a dye or a second color pigment dispersion.

6. The process of claim 5 wherein the dye or color pigment dispersion is nonionic or has a charge polarity different from that of the white pigment dispersion.

7. The process of claim 1 wherein the suspension comprises charged $TiO_2$ particles dispersed in a colored or blackened solvent.

8. The process of claim 1 wherein the suspension is of a subtractive or additive color.

9. A process for the preparation of well-defined cells used in an electrophoretic display, which process comprises the steps of:
   a) filling microcups with a dielectric fluid containing at least a suspension of charged pigment particles in a dielectric solvent or solvent mixture,
   b) sealing the filled microcups by overcoating onto said dielectric fluid a thermoset precursor composition which is at least partially immiscible with said dielectric solvent or solvent mixture and has a specific gravity lower than that of said dielectric solvent or solvent mixture, and
   c) curing said thermoset precursor composition to form the well-defined cells.

10. The process of claim 9 wherein the thermoset precursor composition is diluted with a volatile solvent or solvent mixture which is evaporated after said composition is coated onto the dielectric fluid.

11. The process of claim 9 wherein the overcoated thermoset precursor composition is cured by radiation, heat, moisture, or interfacial reactions at the interface between the composition and the dielectric fluid.

12. The process of claim 9 wherein the thermoset precursor composition comprises a material selected from the group consisting of polyvalent acrylate, polyvalent methacrylate, cyanoacrylate, polyvalent vinyl, polyvalent epoxide, polyvalent isocyanate, polyvalent allyl, and oligomers or polymers containing crosslinkable functional groups.

13. The process of claim 12 wherein said polyvalent vinyl is vinylbenzene, vinylsilane or vinylether.

14. The process of claim 9 wherein the dielectric solvent or solvent mixture has a dielectric constant ranging from about 2 to about 30.

15. The process of claim 9 wherein the dielectric solvent or solvent mixture comprises at least a dispersion of white pigment particles dispersed in said dielectric solvent or solvent mixture colored by a dye or a second color pigment dispersion.

16. The process of claim 15 wherein the dye or color pigment dispersion is nonionic or has a charge polarity different from that of the white pigment dispersion.

17. The process of claim 9 wherein the suspension comprises charged $TiO_2$ particles dispersed in a colored or blackened solvent.

18. The process of claim 9 wherein the suspension is of a subtractive or additive color.

19. The process of claim 9 wherein the dielectric solvent or solvent mixture has a dielectric constant ranging from about 2 to about 10.

20. A process for the manufacture of an electrophoretic display, which process comprises the steps of:
   a) preparing an array of microcups by first coating a layer of a thermoplastic or thermoset precursor on a conductor film followed by embossing the thermoplastic or thermoset precursor layer with a male mold or by imagewise exposing a layer of a radiation curable material on a conductor film and removing the unexposed areas;
   b) filling the thus-formed array of microcups with a dielectric fluid containing at least a charged pigment suspension in a dielectric solvent or solvent mixture;
   c) sealing the array of filled microcups to form a sealed array of electrophoretic cells with a thermoset precursor composition having a specific gravity lower than that of the dielectric solvent or solvent mixture; and
   d) laminating the sealed array of electrophoretic cells with a second conductor film pre-coated with an adhesive layer to form the electrophoretic display.

21. The process of claim 20 wherein the adhesive layer is crosslinkable by heat, moisture or radiation, and is cured during or after lamination.

22. The process of claim 20 wherein the filling and sealing of the microcups is accomplished by filling the microcups with the dielectric fluid containing a mixture of dispersions in a dielectric solvent or solvent mixture, wherein the mixture of dispersions comprises at least a suspension of charged pigment particles and a dispersion of said thermoset precursor composition, followed by curing the thermoset precursor composition during or after it phase separates and forms a supernatant layer above the dielectric solvent or solvent mixture.

23. The process of claim 20 wherein the sealing of the filled microcups is accomplished by overcoating onto said dielectric fluid said thermoset precursor composition which is at least partially immiscible with said dielectric solvent or solvent mixture, followed by curing said thermoset precursor composition.

24. The process of claim 20 wherein one of the conductor films is transparent.

25. A process for the manufacture of a multi-color electrophoretic display, which process comprises the steps of:
   a) preparing an array of microcups by first coating a layer of a thermoplastic or thermoset precursor on a conductor film followed by embossing the thermoplastic or thermoset precursor layer with a male mode or by imagewise exposing a layer of a radiation curable material on a conductor film and removing the unexposed areas;
   b) laminating the thus formed array of microcups with a layer of positive photoresist;
   c) imagewise exposing the positive photoresist to selectively open the microcups in a predetermined area;
   d) filling in the opened microcups with a dielectric fluid comprising at least a white pigment dispersion in a dielectric solvent or solvent mixture containing a dye or pigment dispersion of a first color;
   e) sealing the filled microcups with a thermoset precursor composition having a specific gravity lower than that of the dielectric solvent or solvent mixture to form sealed electrophoretic cells containing said white pigment dispersion in said dielectric solvent or solvent mixture of the first color;
   f) repeating steps c) to e) in different areas with dielectric fluids of different colors to generate groups of sealed electrophoretic cells containing dielectric fluids of different colors thus forming a sealed array of electrophoretic cells;
   g) removing residual positive photoresist, if any; and
   h) laminating the sealed array of electrophoretic cells with a second transparent conductor film precoated with an adhesive layer to form the multi-color electrophoretic display.

26. The process of claim 25 wherein the filling and sealing of the microcups is accomplished by filling the microcups with the dielectric fluid containing a mixture of dispersions in a dielectric solvent or solvent mixture, wherein the mixture of dispersions comprises at least a suspension of charged pigment particles and a dispersion of said thermoset precursor composition, followed by curing the thermoset precursor composition during or after it phase separates and forms a supernatant layer above the dielectric solvent or solvent mixture.

27. The process of claim 25 wherein the sealing of the filled microcups is accomplished by overcoating onto said dielectric fluid said thermoset precursor composition which is at least partially immiscible with said dielectric solvent or solvent mixture, followed by curing said thermoset precursor composition.

28. The process of claim 25 wherein an adhesive layer is precoated on the positive photoresist and laminated onto the array of microcups.

29. The process of claim 28 wherein said adhesive is developable by a developer of the positive photoresist.

30. The process of claim 25 wherein one of the conductor films is transparent.

* * * * *

UNITED STATES PATENT AND TRADEMARK OFFICE
CERTIFICATE OF CORRECTION

PATENT NO.       : 6,930,818 B1  
APPLICATION NO.  : 09/518488  
DATED            : August 16, 2005  
INVENTOR(S)      : Liang et al.

It is certified that error appears in the above-identified patent and that said Letters Patent is hereby corrected as shown below:

On the Title Pages:  
Item (56), Reference cited, Under U.S. PATENT DOCUMENTS  
Right Column, line 5, after "5,978,062", insert

| | | |
|---|---|---|
| --3,229,607 | 01/1966 | Battaglia |
| 3,689,346 | 09/1972 | Rowland |
| 3,885,964 | 05/1975 | Nacci |
| 3,892,568 | 07/1975 | Ota et al. |
| 3,908,052 | 09/1975 | Sanders |
| 4,655,897 | 04/1987 | Disanto et al. |
| 4,741,604 | 05/1988 | Kornfeld |
| 5,177,476 | 01/1993 | Disanto et al. |
| 5,200,120 | 04/1993 | Sakai |
| 5,274,481 | 12/1993 | Kim |
| 5,460,688 | 10/l995 | Disanto et al. |
| 5,589,100 | 12/1996 | Grasso et al. |
| 5,731,860 | 03/1998 | Harada et al. |
| 5,739,889 | 04/1998 | Yamada et al. |
| 5,835,174 | 11/1998 | Clikeman et al. |
| 5,843,333 | 12/1998 | Hakemi |
| 5,872,552 | 02/1999 | Gordon II et al. |
| 5,877,848 | 03/1999 | Gillette et al. |
| 5,895,541 | 04/1999 | Kobayashi et al. |
| 5,942,154 | 08/1999 | Kim et al. |
| 5,976,405 | 11/1999 | Clikeman et al. |
| 5,985,084 | 11/1999 | Summersgill et al. |
| 6,037,058 | 03/2000 | Clikeman et al. |
| 6,113,836 | 09/2000 | Sakai et al. |
| 6,120,946 | 9//2000 | Johnson et al. |
| 6,166,797 | 12//2000 | Bruzzone et al. |
| 6,191,250 | 02/2001 | Aida et al. |

UNITED STATES PATENT AND TRADEMARK OFFICE
CERTIFICATE OF CORRECTION

PATENT NO. : 6,930,818 B1
APPLICATION NO. : 09/518488
DATED : August 16, 2005
INVENTOR(S) : Liang et al.

It is certified that error appears in the above-identified patent and that said Letters Patent is hereby corrected as shown below:

On the Title Pages:
Item (56), Reference cited, Under U.S. PATENT DOCUMENTS (cont'd)

| | | |
|---|---|---|
| 6,400,492 | 06/2002 | Morita et al. |
| 6,512,626 | 01/2003 | Schmidt |
| 6,514,328 | 02/2003 | Katoh et al. |
| 4,190,352 | 02/1980 | Bruning |
| 4,924,257 | 05/1990 | Jain |
| 5,285,236 | 02/1994 | Jain |
| 5,652,645 | 07/1997 | Jain |
| 5,398,041 | 03/1995 | Hyatt |
| 5,432,526 | 07/1995 | Hyatt |
| 5,995,190 | 11/1999 | Nagae et al. |
| 5,956,112 | 09/1999 | Fujimori et al. |
| 5,450,220 | 09/1995 | Onishi et al. |
| 6,018,383 | 01/2000 | Dunn et al. |
| 2001/0009352 | 07/2001 | Moore |
| 2002/0018043 | 02/2002 | Nakanishi |
| 2002/0029969 | 03/2002 | Yager et al. |
| 2002/0126249 | 09/2002 | Liang, et al. |
| 2002/0196525 | 12/2002 | Chen et al. |
| 2002/0188053 | 12/2002 | Zang et al. |
| 09/606,654 | 1/2004 | Liang, et al. --. |

UNITED STATES PATENT AND TRADEMARK OFFICE
CERTIFICATE OF CORRECTION

PATENT NO. : 6,930,818 B1
APPLICATION NO. : 09/518488
DATED : August 16, 2005
INVENTOR(S) : Liang et al.

It is certified that error appears in the above-identified patent and that said Letters Patent is hereby corrected as shown below:

Page 1, (56) Reference cited, Under FOREIGN PATENT DOCUMENTS

Line 4, change "JP     5917930" to --JP     59171930--.

Line 16, after "WO     WO 00/60410   10/2000", insert

| | | |
|---|---|---|
| --DE | 199 27 359.6 | 12/2000 |
| CA | 2,340,683 | 2/2001 |
| EP | 0990942 | 04/2000 |
| EP | 1065553 | 01/2001 |
| EP | 1195603 | 04/2002 |
| JP | 60-205452 | 10/1985 |
| JP | 1-86116 | 01/1990 |
| JP | 02284126 | 11/1990 |
| JP | 6242423 | 09/1994 |
| JP | 2000-035677 | 02/2000 |
| JP | 2000-075497 | 03/2000 |
| JP | 2001-042118 | 02/2001 |
| JP | 2001-056653 | 02/2001 |
| WO | WO 97/04398 | 02/1997 |
| WO | WO 99/08151 | 02/1999 |
| WO | WO 99/53373 | 10/1999 |
| WO | WO 00/03291 | 01/2000 |
| WO | WO 00/77571 | 12/2000 |

UNITED STATES PATENT AND TRADEMARK OFFICE
CERTIFICATE OF CORRECTION

PATENT NO.         : 6,930,818 B1
APPLICATION NO. : 09/518488
DATED                  : August 16, 2005
INVENTOR(S)       : Liang et al.

It is certified that error appears in the above-identified patent and that said Letters Patent is hereby corrected as shown below:

Line 16, after "WO      WO 00/60410    10/2000", insert (cont'd)

WO             WO 01/67170              09/2001

WO             WO 02/01281              01/2002 --

Page 2, right Column, 8th paragraph, line 3, after "Devices-26(8):1148-1152 (1979)", insert --Drzaic, P.S., "Liquid Crystal Dispersions", The PDLC Paradigm, pp 1-9, (1995)

Singer, B. et al, "X-Y Addressable Electrophoretic Display", Proc. SID 18(3/4), pp-255-266 (1977)

Kazlas, P. et al., "12.1: 12.1" SVGA Microencapsulated Electorphoretic Active Matrix Display for Information Applicances" *SID 01 Digest* 152-155(2001)

Bryning et al., "37.4: Reverse-Emulsion Electrophoretic Display (REED)" *SID 98 Digest* pp. 1018-1021 (1998)

Swanson et al., "5.2: High Performance Electrophoretic Displays" *SID 00* Diges, pp-29-31 (2000)

Inoue, S. et al., "High Resolution Microencapsulated Electrophoretic Display (EPD) Driven by Poly-Si TFTs With Four-Level Grayscale" *IEEE Transactions on Electron Devices* 49(8), pp-1532-1539 (2002)

Matsuda Y. "Newly designed, high resolution, active matrix addressing in plane EPD" *IDW 02 EP2-3* 1341-1344 (2002)

Ota et al., "Developments in Electrophoretic Displays" *Proc. of SID*, Vol. 18/3&4, pp-243-254 (1977)

Kishi, E et al, "5.1 Development of In-Plane EPD", Canon Research Center, SID 00 Digest, pp-24-27 --.

UNITED STATES PATENT AND TRADEMARK OFFICE
CERTIFICATE OF CORRECTION

PATENT NO. : 6,930,818 B1
APPLICATION NO. : 09/518488
DATED : August 16, 2005
INVENTOR(S) : Liang et al.

It is certified that error appears in the above-identified patent and that said Letters Patent is hereby corrected as shown below:

In the Specification:

Column 4, at line 43, change "their" to --its--.

Column 7, at line 35, between "not" and "swollen", insert --be--.

Column 8, at line 44, change "the, residual" to --the residual--.

In the Claims:

Column 16, Claim 25, line 6, change "mode" to -- mold --.

Signed and Sealed this

First Day of May, 2007

JON W. DUDAS
*Director of the United States Patent and Trademark Office*